United States Patent [19]
Freeman et al.

[11] Patent Number: 5,396,505
[45] Date of Patent: Mar. 7, 1995

[54] PROGRAMMABLE ERROR-CHECKING MATRIX FOR DIGITAL COMMUNICATION SYSTEM

[75] Inventors: Jon C. Freeman, Sunnyvale; Cheng-Gang Kong, Saratoga, both of Calif.

[73] Assignee: Tandem Computers Incorporated, Cupertino, Calif.

[21] Appl. No.: 87,545

[22] Filed: Jul. 6, 1993

[51] Int. Cl.⁶ .............................................. G06F 11/00
[52] U.S. Cl. .................................. 371/57.1; 371/48; 395/200
[58] Field of Search ................ 371/57.1, 48, 55, 35; 364/265, 265.1; 395/200

[56] References Cited

U.S. PATENT DOCUMENTS

| | | | |
|---|---|---|---|
| 4,418,384 | 11/1983 | Holtey et al. | 364/200 |
| 4,545,055 | 10/1985 | Patel | 371/55 |
| 4,646,300 | 2/1987 | Goodman et al. | 371/33 |
| 4,908,823 | 3/1990 | Haagens et al. | 370/85.1 |
| 4,932,023 | 6/1990 | Geyer et al. | 370/85.5 |
| 4,939,735 | 7/1990 | Fredericks et al. | 371/47.1 |
| 4,975,882 | 12/1990 | Kuo et al. | |
| 4,991,133 | 12/1991 | Davis et al. | |
| 5,007,051 | 4/1991 | Dolkas et al. | 370/110.1 |
| 5,128,945 | 7/1992 | Enns et al. | 371/37.1 |
| 5,206,952 | 4/1993 | Sundet et al. | 395/575 |
| 5,271,020 | 12/1990 | Marisetty | 371/30 |
| 5,293,384 | 3/1994 | Keeley et al. | 371/16.3 |
| 5,307,179 | 4/1994 | Yoshida | |

FOREIGN PATENT DOCUMENTS

| | | | |
|---|---|---|---|
| 1127747 | 12/1988 | Canada | G06F 13/02 |
| 0474932 | 12/1992 | European Pat. Off. | H04L 12/26 |

*Primary Examiner*—Charles E. Atkinson
*Assistant Examiner*—Albert Decady
*Attorney, Agent, or Firm*—Townsend and Townsend Khourie and Crew

[57] ABSTRACT

A programmable system for checking for protocol errors in a communication system includes a matrix for generating error checking signals selected by data fields utilized to implement a communication. If the configuration or protocol is changed the system facilitates reprogramming to compensate for the change.

7 Claims, 7 Drawing Sheets

FIG. 5.

|  | RESPONDER | | | | | | | | | | | | | | | | PARITY |
|---|---|---|---|---|---|---|---|---|---|---|---|---|---|---|---|---|---|
| | MDC | PIC | IPBX | IPBY | MIC | UNUSED5 | UNUSED6 | UNUSED7 | IOS0 | IOS1 | IOS2 | IOS3 | ALL_IOS | OPT | UNUSEDE | UNUSEDF | |
| REQUESTOR | | | | | | | | | | | | | | | | | |
| MDC | 0 | 0 | 0 | 0 | 0 | 1 | 1 | 1 | 0 | 0 | 0 | 0 | 0 | 0 | 1 | 1 | 1 |
| PIC | 0 | 1 | 0 | 0 | 0 | 1 | 1 | 1 | 0 | 0 | 0 | 0 | 0 | 0 | 1 | 1 | 0 |
| IPBX | 0 | 0 | 1 | 0 | 0 | 1 | 1 | 1 | 0 | 0 | 0 | 0 | 0 | 0 | 1 | 1 | 0 |
| IPBY | 0 | 0 | 0 | 1 | 0 | 1 | 1 | 1 | 0 | 0 | 0 | 0 | 0 | 0 | 1 | 1 | 0 |
| MIC | 1 | 1 | 1 | 1 | 1 | 1 | 1 | 1 | 1 | 1 | 1 | 1 | 1 | 1 | 1 | 1 | 0 |
| UNUSED5 | 1 | 1 | 1 | 1 | 1 | 1 | 1 | 1 | 1 | 1 | 1 | 1 | 1 | 1 | 1 | 1 | 0 |
| UNUSED6 | 1 | 1 | 1 | 1 | 1 | 1 | 1 | 1 | 1 | 1 | 1 | 1 | 1 | 1 | 1 | 1 | 0 |
| UNUSED7 | 1 | 1 | 1 | 1 | 1 | 1 | 1 | 1 | 1 | 1 | 1 | 1 | 1 | 1 | 1 | 1 | 0 |
| IOS0 | 1 | 0 | 1 | 1 | 0 | 1 | 1 | 1 | 1 | 1 | 1 | 1 | 1 | 1 | 1 | 1 | 0 |
| IOS1 | 1 | 0 | 1 | 1 | 0 | 1 | 1 | 1 | 1 | 1 | 1 | 1 | 1 | 1 | 1 | 1 | 0 |
| IOS2 | 1 | 0 | 1 | 1 | 0 | 1 | 1 | 1 | 1 | 1 | 1 | 1 | 1 | 1 | 1 | 1 | 0 |
| IOS3 | 1 | 0 | 1 | 1 | 0 | 1 | 1 | 1 | 1 | 1 | 1 | 1 | 1 | 1 | 1 | 1 | 0 |
| ALL_IOS | 1 | 1 | 1 | 1 | 0 | 1 | 1 | 1 | 1 | 1 | 1 | 1 | 1 | 1 | 1 | 1 | 0 |
| OPT | 0 | 0 | 1 | 1 | 0 | 1 | 1 | 1 | 1 | 1 | 1 | 1 | 1 | 1 | 1 | 1 | 1 |
| UNUSEDE | 1 | 0 | 1 | 1 | 0 | 1 | 1 | 1 | 1 | 1 | 1 | 1 | 1 | 1 | 1 | 1 | 0 |
| UNUSEDF | 1 | 1 | 1 | 1 | 1 | 1 | 1 | 1 | 1 | 1 | 1 | 1 | 1 | 1 | 1 | 1 | 0 |

| COMMAND | TRANSFER LENGTH | | | | | | | | | | | | | | | | |
|---|---|---|---|---|---|---|---|---|---|---|---|---|---|---|---|---|---|
| | ROW MASK/ CONFIGURATION | 0 WORD | 1 WORD | 2 WORD | 3 WORD | 4 WORD | 5 WORD | 6 WORD | 7 WORD | 8 WORD | 9 WORD | A WORD | B WORD | C WORD | D WORD | E WORD | F WORD |
| | | | | | | | | | | 16 | 32 | 64 | 128 | 256 | 512 | 1K | 2K |
| 0 - WORD READ | P, LHA | OK | \multicolumn{16}{l|}{PROTOCOL ERROR} |
| 1 - UNDEFINED | UC1L/H,P,LHA | undefined command 1 error/UC1L mask ; undefined command 1 error/UC1H mask |
| 2 - BLOCK READ | P, LHA | PRE | OK | | | | | | | pre/CLSH mask;protocol error/BLKH mask |
| 3 - SUB-BLOCK ORDERED READ | P, LHA | PROTOCOL ERROR | | | | | | | OK | PRE/SB0H; PROTOCOL ERROR |
| 4 - UNDEFINED | UC4L/H,P,LHA | undefined command 4 error/UC4L mask ; undefined command 4 error/UC4H mask |
| 5 - UNDEFINED | UC5L/H,P,LHA | undefined command 5 error/UC5L mask ; undefined command 5 error/UC5H mask |
| 6 - BLOCK WRITE | P, LHA | PRE | OK | | | | | | | PRE/CLSH ; PROTOCOL ERROR/ MASK ; BLKH MASK |
| 7 - COHERENT BLOCK WRITE | | OK | \multicolumn{16}{l|}{PROTOCOL ERROR} |
| 8 - WORD WRITE | | OK | |
| 9 - COHERENT WORD WRITE | | OK | |
| A - WRITE 1 BYTE | | OK | |
| B - COHERENT WRITE 1 BYTE | | OK | |
| C - WRITE 2 BYTES | | OK | |
| D - COHERENT WRITE 2 BYTES | | OK | |
| E - WRITE 3 BYTES | | OK | |
| F - COHERENT WRITE 3 BYTES | | OK | |

| COLUMN MASKS | | | | |
|---|---|---|---|---|
| BLOCK OPERATION COLUMN CONFIGURATION | — | — | — | SBCH | BLKH |
| BLOCK OPERATION COLUMN CONFIGURATION | P,L | | CLSH | — |
| UNDEFINED CMDS 1,4,5 COLUMN CONFIGURATION | UC1L, UC4L, UC5L | | UC1H, UC4H, UC5H |

FIG. 6.

| RESPONDER HANDSHAKE | ROW MASK | 0 WAIT | 1 UN DEF | 2 UN DEF | 3 UN DEF | 4 UN DEF | 5 UN DEF | 6 UN DEF | 7 BIL RDY | 8 IDLE | 9 UCME | A RDY EVEN | B UN DEF | C COH RETRY | D HARD ABORT | E UN DEF | F RDY ODD |
|---|---|---|---|---|---|---|---|---|---|---|---|---|---|---|---|---|---|
| COMMAND | | | | | | | | | | | | | | | | | |
| 0 - WORD READ | P | OK | | | | PROTOCOL ERROR | | | | OK | | | | PRE | | | OK |
| 1 - UNDEFINED | — | | | | | | UNDEFINED COMMAND 1 ERROR | | | | | | | | | | |
| 2 - BLOCK READ | P | OK | | | | PROTOCOL ERROR | | | PRE | | OK | | | PRE | | | OK |
| 3 - SUB-BLOCK ORDERED READ | — | | | | | | | | | | | | | | | | |
| 4 - UNDEFINED | — | | | | | UNDEFINED COMMAND 4 ERROR | | | | | | | | | | | |
| 5 - UNDEFINED | | | | | | UNDEFINED COMMAND 5 ERROR | | | | | | | | | | | |
| 6 - BLOCK WRITE | P | OK | | | PROTOCOL ERROR | | | OK | PRE | | OK | | PRE OK | | PRE | | |
| 7 - COHERENT BLOCK WRITE | | | | | | | | | | | | | | PRE OK | | | |
| 8 - WORD WRITE | | | | | | | | | | | | | | PRE OK | | | |
| 9 - COHERENT WORD WRITE | | | | | | | | | | | | | | PRE OK | | | |
| A - WRITE 1 BYTE | | | | | | | | | | | | | | PRE OK | | | |
| B - COHERENT WRITE 1 BYTE | | | | | | | | | | | | | | | | | |
| C - WRITE 2 BYTES | | | | | | | | | | | | | | | | | |
| D - COHERENT WRITE 2 BYTES | | | | | | | | | | | | | | | | | |
| E - WRITE 3 BYTES | | | | | | | | | | | | | | | | | |
| F - COHERENT WRITE 3 BYTES | | | | | | | | | | | | | | | | | |
| COLUMN CONFIGURATION | | — | UHS1 | UHS2 | UHS3 | UHS4 | UHS5 | UHS6 | — | — | — | — | UHSB | — | HAM | UHSE | — |
| COLUMN MASKS | | | | | | | | | P, HS | | | | | | | | |
| HARD ABORT COLUMN CONFIGURATION | | | | | | | | | | | | | | | HAG | | — |

FIG. 7.

PROGRAMMABLE ERROR-CHECKING MATRIX FOR DIGITAL COMMUNICATION SYSTEM

FIELD OF THE INVENTION

The present invention relates generally to error checking systems and more particularly relates to programmably checking the intersection matrix of multiple control and identifier fields in digital communication systems.

DESCRIPTION OF THE RELEVANT ART

All digital communication systems require a set of rules, called a protocol, to control communications between different modules in the system. It is well known to implement error checking systems to assure that a particular communication does not violate the protocol.

In many systems a communication includes a handshaking operation to establish a link between two modules. Various data fields are transferred during various phases of an operation that allow the modules to gain control of a communication channel, identify each other and the type of operation to be performed, to verify the readiness of each module to perform the operation, and to transfer data over the communication channel. The protocol specifies the values of data fields that may be generated during each of these phases.

One of the advantages of digital systems is the ability to reconfigure the hardware by adding or deleting modules or functions and to change the protocol to change the field values utilized during the different phases. However, existing error checking function are generally not reconfigurable thereby limiting their utility in digital communication systems.

SUMMARY OF THE INVENTION

The present invention is a reconfigurable error checking system for use in digital communication systems. The error checking system utilizes the values of an error checking function to check whether the data fields generated during a particular communication are allowed or forbidden by a communication protocol. The system can be reconfigured by modifying the error checking function.

According to one aspect of the invention, error checking signals are programmably stored and selected by particular combinations of fields generated during a communication operation. The value of the selected error checking signal indicates whether the values of the particular combination of fields is allowed by the protocol.

According to another aspect of the invention, the error checking signals are generated by a hard-wired matrix decoder. The particular error signal generated is selected by a particular combinations of fields generated during a communication operation. If the error signal has a predetermined value then the particular combination of fields is forbidden by the protocol. Row and column mask registers programmably store error mask/configuration signals, having either a masking or nonmasking value, which are selected by the fields included in the particular combination. The selected error signal and error mask/configuration signals are provided to a logic circuit which changes the value of the selected error signal if its value is the predetermined value and a selected mask/configuration signal has the masking value.

According to another aspect of the invention, the error checking system is included in every module of a communication system to provide for fault-tolerance to allow checking of the communication channel for errors.

Further features and advantages will become apparent in view of the appended drawings and following detailed description.

BRIEF DESCRIPTION OF DRAWINGS

FIG. 5 depicts a fully programmable error checking matrix.

FIG. 6 depicts a matrix decoder having columns identified by different transfer length values and rows identified by different bus commands.

FIG. 7 depicts a COMMAND/HANDSHAKE hard wired error checking matrix.

DESCRIPTION OF THE PREFERRED EMBODIMENTS

The present invention is an error checking system having general utility in many types of digital communication systems. Many of the features of the system can better appreciated when described in the context of a particular bus system. In the following detailed description the error checking system will be described with reference to a bus subsystem utilized in computers manufactured by Tandem Computers, Inc. The bus subsystem will be described only in sufficient detail to support the detailed description of the invention.

Figure 1:
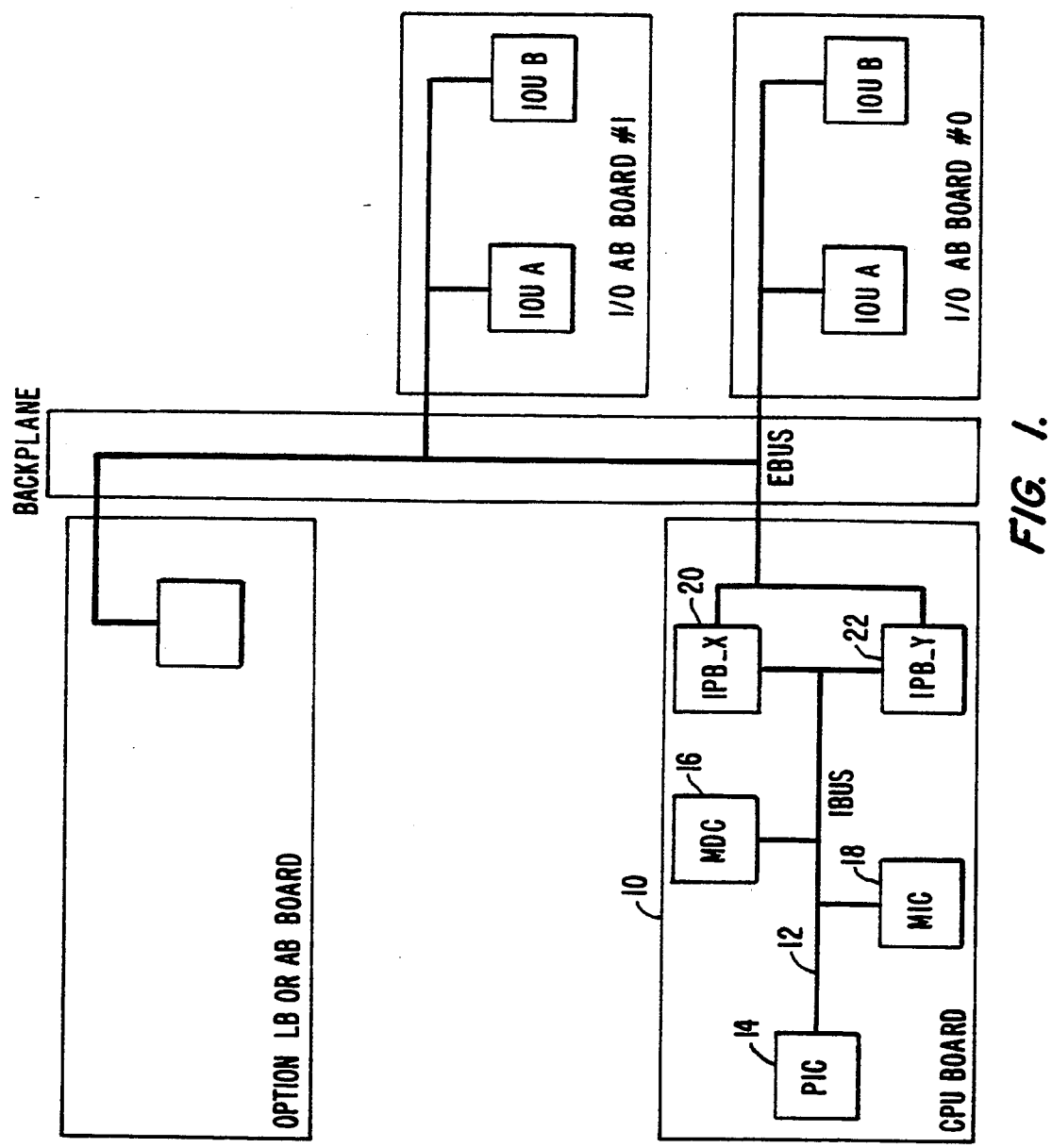
FIG. 1 depicts a shared bus communication system including a CPU 10 having several modules that communicate via a shared bus (IBUS) 12.

FIG. 1 depicts a shared bus communication system including a CPU board 10 having several modules that communicate via a shared bus (IBUS) 12. These modules include a processor interface chip (PIC) 14, a maintenance diagnostic chip (MDC) 16, a memory interface chip (MIC) 18, and two bus interface modules (IPB_X and IPB_Y) 20 and 22.

The IBUS 12 is synchronous parallel data path over which independent modules may transfer address and data information in a structured environment. The bus operations are synchronous with a basic system clock. All events on the IBUS occur relative to the rising edge of the clock. Two basic operations over the bus are defined; Arbitration and Transfer, each capable of occurring simultaneously.

The Arbitration operation allows one of the modules to become a master to gain sole ownership of the IBUS. Modules desiring to gain ownership of the IBUS (Requestor modules) must arbitrate and gain ownership of the IBUS before attempting to transfer information.

The Transfer operation allows a Requestor that has gained ownership of the IBUS to send data to or receive data from a Responder module and includes Command and Data Phases. During the Command Phase, the Requestor, after arbitrating and gaining ownership of the IBUS, places and address of a selected module on the Address/Data lines and a command on the Handshake lines. During the Data Phase, data is transferred between the Requestor and Responder. The length of the transfer is determined by the Requestor during the Command Phase and can range from a single byte to many words.

Figure 2:
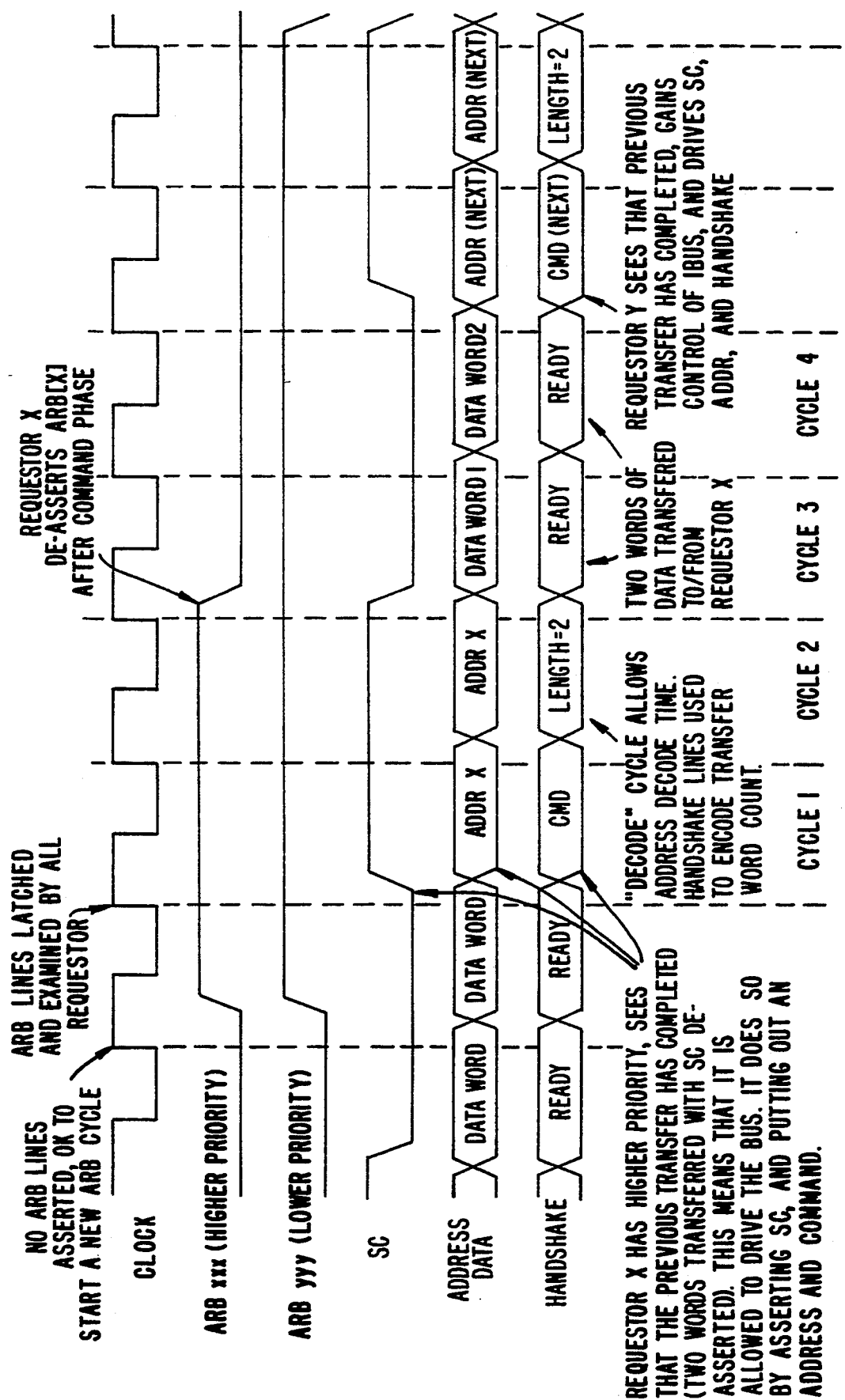
FIG. 2 depicts the arbitration, command, and data phases of a basic IBUS operation.

FIG. 2 depicts the arbitration, command, and data phases of a basic IBUS operation. Requestors X and Y assert their Arb lines to request ownership of the IBUS and SC (system control) is asserted at CYCLE 1 granting ownership to the bus to Requestor X (which in this example has higher priority than Requestor Y). During the Command Phase, Requestor X drives the high and low addresses of the selected Responder on the Address/Data lines during CYCLE 1 and CYCLE 2 and drives the command (CMD) on the Handshake lines during CYCLE 1 and the length of the data transfer (LENGTH) on the Handshake lines during CYCLE 2. During the Data Phase, data is transferred between the Requestor and Responder on the Address/Data lines during CYCLES 3 and 4. Also, during the Data Phase, the Responder handshakes on the handshake lines with READYODD for the first word in a transfer and READYEVEN for all subsequent words in a transfer.

Figure 3:
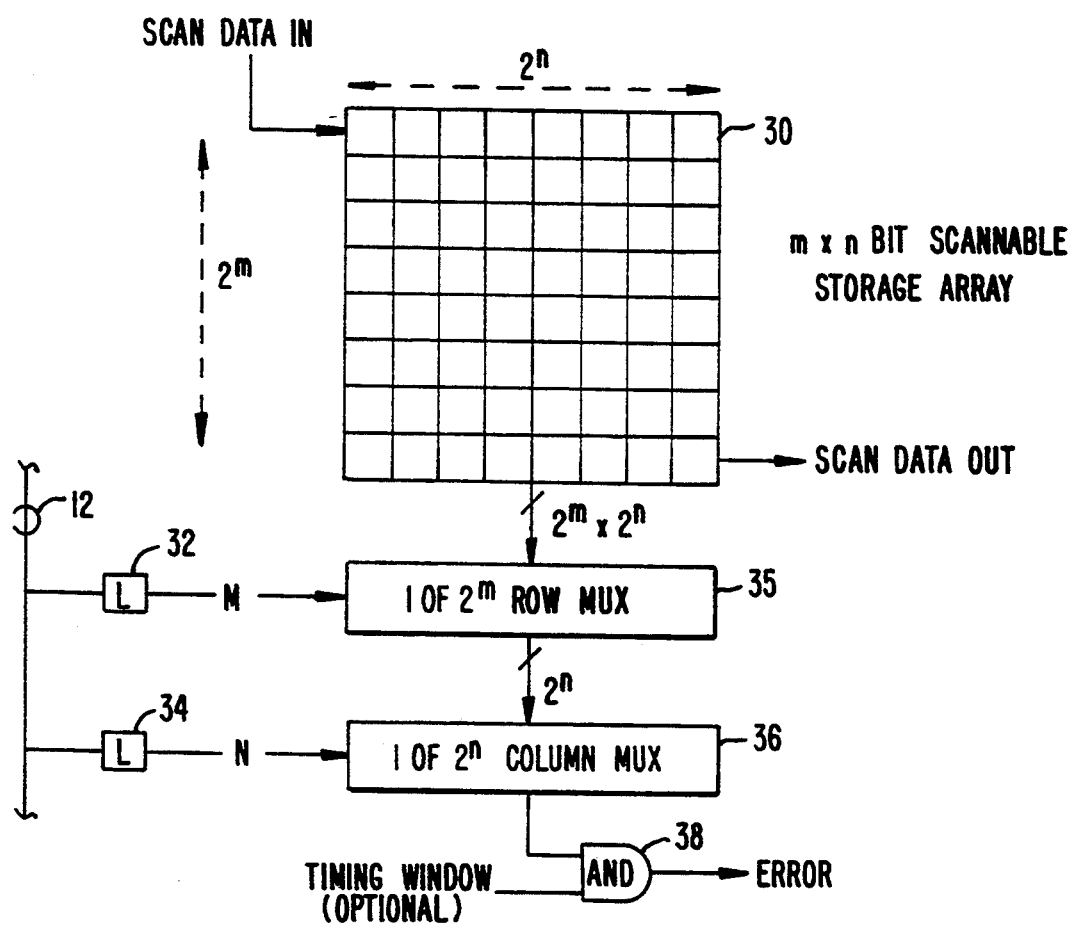
FIG. 3 is a block diagram of an embodiment of the present invention which supports full programmability of the error condition to be checked.

FIG. 3 is block diagram of an embodiment of the present invention which supports full programmability of the error conditions to be checked. As described above, a bus operation requires the transfer of several data fields which represent information required to implement a data transfer. The bus transfer protocol establishes whether particular values of a pair of fields, M and N, are allowed. For example, the M and N fields may respectively identify a requestor module and responder module. In this case the error checker would be programmed to output a true value if a communication between the particular modules identified by the M and N values were not allowed by the protocol.

Thus, the embodiment of FIG. 3 implements the error checking function:

F(M,N)=T only when the values encoded by M and N are not allowed and F otherwise.

If M is an m-bit data field and N is an n-bit data field then the data fields may encode up to $2^m$ and $2^n$ values respectively. The symbols M and N in the above equation represent pairings of the values of a particular pair of M and N fields. Thus, if the values encoded by a particular pair of M and N fields are forbidden by the protocol then the value of the function value is true (T) and if the values are not forbidden the function value is false (F).

Turning to FIG. 3, a fully programmable check matrix 30 is implemented in a gate array. The matrix is formed by scannable registers and has scan_data_in input and a scan_data_output. The fields being checked, M and N, have widths m and n respectively. Accordingly, the matrix has $2^n$ columns and $2^m$ rows.

The M and N fields generated on the bus are latched at the appropriate time by M and N latches 32 and 34 and are applied, respectively, to a row MUX 35 and a column MUX 36 for selecting a unique row and column corresponding to the applied fields. The selected output is applied to one input of an output AND gate 38 and a timing window signal (optional) is applied to the other input to provide a clocked error signal.

The operation of the embodiment depicted in FIG. 3 will now be described. The F(M,N) values corresponding to a selected hardware configuration and bus transfer protocol are selected and arranged in a scan pattern having $2^n 2^m$ bit positions. The order of the bits will be determined by the particular scan path established in the matrix. After the scan pattern is read into the matrix through the scan data_in input each value of F(M,N) will be stored at the particular storage location selected by the received pair of M and N fields. If the system is reconfigured or protocol is changed a different scan pattern is read into the matrix to reconfigure the error checking system.

Figure 4:
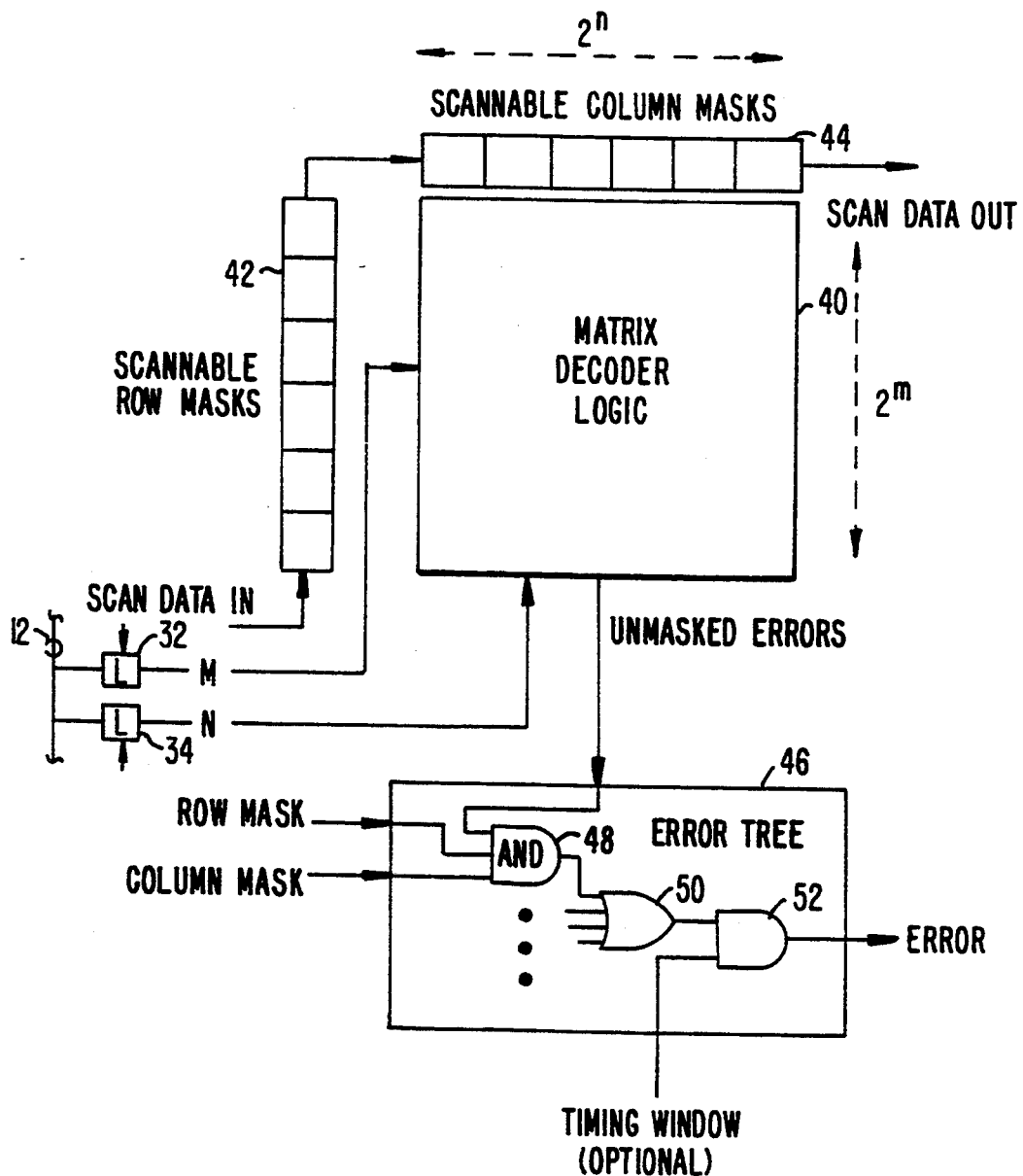
FIG. 4 is a block diagram of the second preferred embodiment of the invention.

FIG. 4 is a block diagram of a second preferred embodiment of the invention which reduces the number of storage elements required in the first embodiment and in many applications reduces the gate count.

In FIG. 4, a matrix decoder logic 40 block receives pairs of M and N signals at its row and column inputs and provides an unmasked error checking signal at its output selected by the received pair of M and N signals. Scannable row and column registers 42 and 44 have a scan_data_in input and a scan_data_out output. The scannable row and column registers store "error mask/configuration bits" which are selectable by particular row inputs, column inputs, or row/column cross-section inputs.

The selection of the error mask/configuration bits is performed by an error tree 46 implemented in hardware. The hardware includes a masking AND gate 48 for receiving the selected error mask/configuration bits as gating inputs and the selected unmasked error checking signal as the signal input and provides a maskable error checking signal at its output. The outputs of the masking AND gates are coupled to the input of an OR gate 50 having its output coupled to the input of a timing AND gate 52. The other input of the timing AND gate 52 receives a timing window signal (optional) and its output is a timed error checking signal.

The operation of the embodiment depicted in FIG. 4 will now be described. The predetermined error checking function for a particular protocol is hardwired into the gate array of the matrix decoder logic block. If the selected row and column error checking bits are all TRUE then the masking AND gate 48 is open and maskable error checking signal is equal to the unmasked error checking signal.

Although the error function is hardwired into the matrix decoder logic, the scannable configuration registers 42 and 48 allow the error checking bit for particular received row inputs, column inputs, or row/column intersection inputs to be programmably changed from TRUE to FALSE. As is apparent from FIG. 4, if either the row or column configuration bit for a given M or N field is FALSE then the output of the corresponding masking AND gate is always FALSE. Accordingly, a TRUE unmasked error bit may be programmably changed to FALSE. The converse is not possible however, that is, a FALSE unmasked error bit cannot be programmably changed to TRUE. Thus, a particular row input, column input, or row/column intersection input that was previously forbidden can allowed in the new protocol so specifies by reprogramming the corresponding masking/configuration bits to the masking state.

One of the embodiments depicted in FIGS. 3 and 4 may be more suitable for a particular application. FIGS. 5–7 are diagrams depicting specific applications of the preferred embodiments.

The fully programmable embodiment of FIG. 3 may be better suited to an application having a great deal of flexibility and reconfigurability. For example, the allowable and forbidden responder/requestor pairs may be changed and the fully programmable embodiment may be more suitable.

FIG. 5 depicts a fully programmable error checking matrix. In this configuration the responder ID data field values and requestor ID data field values for a particular bus transaction are utilized as the column and row identifiers. These IDs are generated on the bus during CYCLE 2 (FIG. 2) of the bus transfer. A zero value at the intersection of a particular requestor/responder pair designates that the pair is allowed by the bus protocol. If the protocol were changed the intersection values would be recoded via scan. Note also that if another module were connected, e.g., an asynchronous transfer module, one of the unused rows and columns could be designated for this module and modified error checking signals stored in the designated row or column.

The mask programmable embodiment of FIG. 4 may be better suited to an application having a small degree of flexibility. For example, for a particular protocol certain data types of data transfer operations may be allowable for a small set of data transfer lengths. For another protocol the number of data transfer lengths allowable for some types of data transfers may be changed. These changes can be implemented by reprogramming the configuration bits in the mask registers.

FIG. 6 depicts a matrix decoder having columns identified by different transfer length values and rows identified by different bus commands. The diagram includes a mapping pairing the actual field values, i.e., O through F, to the symbolic command and word length parameters. For example, a command field value equal to "6" symbolizes a Block Write command and a transfer length field value equal to "6" symbolizes a 7 word transfer length. The "pre" or "protocol error" areas of the matrix are hardwired to TRUE values and "ok" areas are hardwired to FALSE values.

Referring back to FIG. 2, the CMD and LENGTH handshakes are generated on the handshake line in successive clock cycles. The command field is latched and provided to the error checking decoder when the length field is generated. The advantage of the hardwired embodiment to reduce gate count is now apparent. Note that for row inputs 8 through F transfers for less than one word are defined by the command field. Accordingly, a protocol error is defined for the row-/column intersection of rows 8 through F and columns 1 through F because columns i through F are for transfer lengths of greater than one word. Thus, a simple gate configuration generates the error checking signal for 120 possible row/column intersections.

The versatility of the masking function is also demonstrated. For example, in the matrix of FIG. 6 the row inputs 2, 4, and 5 are undefined commands that produce unmasked error checking signals when received. However, if the row input 4 were later defined as a command that transferred 1 to 8 words, then unmasked error checking signal would be masked if the UC4L mask bit were reset so that no error signal would be generated for a command field equal to 4. Additionally, if it were desired to remove the length error checking function from the system the L mask bit would be reset.

FIG. 7 depicts a COMMAND/HANDSHAKE hard-wired error checking matrix. Note from FIGS. 6 and 7 that if the protocol error mask bit (P) is reset then both the CMD/LENGTH and CMD/HANDSHAKE error checking functions are masked. Thus, the error tree includes a masking gate for masking the unmasked error checking signals generated by both hard-wired decoders. Further, from FIG. 7, if any of the handshake signals 1–6 are later defined, the unmasked error checking signal can be masked by a respective one of the masking bits UHS1–UHS6. Additionally, the handshake error checker matrix can be masked by resetting the HS masking bit.

Referring back to FIG. 1, in the preferred embodiment the error checking matrices are redundantly included on each module and the error checking signals are received and processed by the MDC 16. This redundancy provides for fault-tolerant operation in the event of the failure of a particular error checking matrix. Additionally, electrical problems with the bus can be detected if the results of checking on the different modules are inconsistent.

The invention has now been described in detail with reference to the preferred embodiment. Alternatives and substitution will be apparent to persons of ordinary skill in the art. For example, although the invention has been defined with reference to a shared bus communication system, it is equally applicable to digital communication system utilizing other communication channels such as telephone line, optical fiber, microwave, or radio-frequency links. Additionally, the checking matrices in the preferred embodiment are implemented in gate arrays, but any suitable storage medium such as RAM, ROM, or general purpose registers can be utilized. The intersection of two fields has been described but error checking based on more than two fields can also be implemented. Accordingly, it is not intended to limit the invention except as provided in the claims.

What is claimed is:

1. In a system having a plurality of modules coupled by a communication channel and having a communication protocol utilizing first and second data fields, said first data field encoding one of a plurality of M values, M being an integer and said second data field encoding one of a plurality of N values, N being an integer, with said first and second data fields transmitted in succession on the channel to define and control communication operations, a method for checking for protocol errors comprising the steps of:

writing an error checking signal to a unique storage location in a group of N×M storage locations for each one of a set of the M×N possible pairs to said first and second data field values where said group of storage locations is divided into M first data field sets of storage locations, each first data field set including N storage locations with each storage location included in only one first data field set, with each written error checking signal having either a first check value indicating that the possible pair is allowed by the communication protocol or having a second check value indicating that the possible pair is forbidden by the communication protocol;

receiving a given pair of said first and second data fields transmitted on said channel during a particular communication operation;

decoding a received first data field to obtain a first data field value;

utilizing only said first data field value to select a unique one of first data field sets;

decoding a received second data field to obtain a second data field value;

utilizing only said received second data field value to select a unique one of the N storage locations in the unique first data field set selected by said received first data field to provide a selected error checking signal selected only by said first and second received data fields; and aborting the particular communication operation if the selected error checking signal indicates that the received first and second data fields are not allowed by the communication protocol.

2. The method of claim 1 further comprising the step of:

rewriting said selected error checking signal if the protocol is modified.

3. In a digital system including multiple modules coupled by a communication channel and that performs operations specified by first and second data fields transmitted on the channel to govern inter-module communication and operations, an error checking system, responsive to selected data fields, for indicating whether operations specified by the selected fields are allowed according to a particular hardware configuration and communication protocol, said error checking system comprising;

a first non-programmable matrix decoder, having row and column inputs for receiving first and second fields respectively and an output for transmitting an unmasked error checking signal selected by said first and second fields received at said inputs, with said error checking signal having either a first check value if the first and second fields are not allowed by the particular hardware configuration and communication protocol or a second check value if the first and second data fields are allowed;

means for providing selected first and second data fields to respective row and column inputs of said matrix decoder to select an unmasked error checking signal;

a programmable row mask register for storing a set of row configuration bits, each bit programmably set to either a masking state or non-masking state; and mask logic means, coupled to the output of said matrix decoder and coupled to said row mask register to receive the unmasked error checking value, and a row configuration bit selected by said first data field received at the row input of said matrix decoder, for providing an unmasked error signal having said second check value regardless of the value of said unmasked error signal output by said matrix decoder if the row configuration bit selected is set to the masking state and for providing an unmasked error signal having a value equal to the check value of said unmasked error signal output by said matrix if the row configuration bit selected is set to the unmasking state so that a pair of first and second fields previously forbidden can be allowed by re-programming a row configuration bit.

4. The error checking system of claim 3 wherein said first matrix decoder comprises:

a hard-wired logic circuit for generating one unmasked error checking signal for any pair of first and second data fields having a first data field included in a plurality of selected first data fields and a second data field included in a plurality of selected second data fields.

5. The error checking system of claim 3 further comprising:

a second matrix decoder, having row and column inputs for receiving said first-data field and a third data field respectively and an output for transmitting an unmasked error checking signal selected by said first and third fields received at said inputs, with said error checking signal having either said first check value if the first and third fields are not allowed by the particular hardware configuration and communication protocol said second check value if said first and third data fields are allowed; and further comprising:

an error tree coupled to said second matrix decoder and said row mask register for providing an error signal having said first value regardless of the value of an unmasked error signal selected by the first and third data fields if the row configuration bit selected by the first data field is in the masked state.

6. The error checking system of claim 3 wherein:

a single error signal is accessed by each first data field in a set of different first data fields to reduce the size and complexity of said matrix decoder.

7. The error checking system of claim 6 wherein:

said row mask register has a single storage location for storing a first row configuration bit selected by each first data field included in said set of different first data fields to reduce the size and complexity of said row mask register.

* * * * *